United States Patent [19]
Alsina

[11] 3,982,030
[45] Sept. 21, 1976

[54] PRESERVATION OF CRUSTACEA

[75] Inventor: D. Luis Gutierrez Alsina, Valencia, Spain

[73] Assignee: Gutix S.A., Valencia, Spain

[22] Filed: Apr. 16, 1974

[21] Appl. No.: 461,294

[30] Foreign Application Priority Data
May 14, 1973  Spain .................................. 414753

[52] U.S. Cl. ................................ 426/269; 426/332; 426/643; 252/400 R
[51] Int. Cl.² ............................................ A23B 4/02
[58] Field of Search ........... 426/227, 228, 268, 269, 426/262, 151, 178, 376, 224, 225, 183, 74, 328, 332, 541, 546; 252/400 R, 407, 380, 399; 424/44

[56] References Cited
UNITED STATES PATENTS

| | | | |
|---|---|---|---|
| 1,927,123 | 9/1933 | Howe.................................. | 426/268 |
| 2,147,743 | 2/1939 | Levin .................................... | 424/44 |
| 2,294,428 | 9/1942 | Stockhamer........................ | 426/224 |
| 2,628,905 | 2/1953 | Antle et al. ......................... | 426/268 |

*Primary Examiner*—Hiram H. Bernstein
*Attorney, Agent, or Firm*—Haseltine, Lake & Waters

[57] ABSTRACT

A composition for the preservation of crustacea is described. This composition contains magnesium carbonate, citric acid and an inorganic metabisulfite, and is effective in preserving crustacea particularly by preventing melanosis.

3 Claims, No Drawings

PRESERVATION OF CRUSTACEA

The present invention relates to the preservation of crustacea. It particularly relates to a composition for preserving crustacea, by preventing melanosis, a process for preparing said composition, and to a method of preservation of crustacea using said composition.

In accordance with the present invention there is provided a composition for preserving crustacea, comprising magnesium carbonate, a sulfite, and an organic acid. Suitable sulfites are alkali metal sulfites, bisulfites, and metabisulfites, preferably the sodium and potassium metabisulfites. Preferred organic acids are hydroxy-carboxylic acids such as citric and tartaric acids. The present invention also provides a process for preparing such composition.

Metabisulfites of sodium and potassium are known as additives for preserving crustacea by preventing melanosis, but from a commercial point of view, they have not proved safe for use in preservation since they are unstable and when mixed with crustacea. Once all the sulfite is used up, these compounds are reversible in their properties since the hydroxides which remain favor the formation of melanosis. Furthermore, the duration of preservation has been very short in aqueous solution.

Citric acid, by itself, does not prevent melanosis thereby preserving crustacea. Its value, however, lies in its ability to potentiate other preservatives and to maintain a low pH in the medium in which crustacea are preserved.

While magnesium carbonate itself does not possess any properties of preserving crustacea, it has been found that the addition of magnesium carbonate to a composition containing citric or tartaric acid and a sulfite, bisulfite or metabisulfite of sodium or potassium will provide compositions having surprisingly high activity in preserving crustacea by preventing melanosis. Furthermore, in accordance with the process of preparing such composition, it is now possible to prepare a stable powdered composition comprising these compounds; that is, it is now possible to prepare a mixture of citric acid and a metabisulfite in powder without either of these compounds decomposing when placed into contact with each other. This has, heretofore, been impossible. None of the ingredients individually nor the composition comprising these ingredients is toxic.

The preferred compositions of the present invention comprise from about 25 to 35% by weight of magnesium carbonate, from about 40 to 60% by weight of citric or tartaric acid or a mixture thereof, and from about 15 to 25% by weight of a sodium or potassium sulfite, bisulfite or metasulfites or mixtures thereof, in powder form of preferably about 400 mesh per square centimeter.

The commercial preparation of these compositions is carried out following a vigorous procedure in order that it may reproducable and result in stable compositions. In using the composition, it is dissolved in drinking water or sea water, and the resulting decomposition of the three componants results in the formation of sulphates, citrate, chlorides and gases such as carbon dioxide and sulfur dioxide, which are necessary to inhibit the oxidation of the thyroxine by which melanin is formed in the crustacen, to maintain a pH lower than 5 and to retard the decomposition of crustacea.

The process for preparing a composition according to the present invention is described below.

Magnesium carbonate, citric acid, and sodium metabisulfite are ground separately in stainless steel mills to a mesh size of 400 per square centimeter.

The mills should be situated in an air conditioned enclosure with a minimum level of humidity, yet at a level which is necessarily permissable for humans to work in.

After the grinding is carried out, the individual powdered ingredients, in desired amounts, are mixed in a suitable mixing apparatus in the proportions which have been given above, and when the mixture has been obtained the final product is enclosed in bags of plastics material which may be welded by heat, the bags being preferably of polyethylene and being under vacua when closed.

Until the moment that the three constituent compounds of the additive are put into the mills, they should be in contact with the exterior air. Furthermore, at the outlets of the mills, the mills are coupled to plastic tubes which lead directly to the mixing machines thus preventing exposure to the air. Similarly, plastic tubes lead from the outlets of the mixing machines to the packing machines. The mixing machine for the milled compounds has a hot air intake coupled to it at 50°C, the air being previously suitably dehydrated. This machine has an outlet for this air, the outlets being protected by tubes of suitable woven material so that the air is allowed to leave but not the powder of the product compound which is thereby left to dry.

The results obtained over two years using compositions of this invention are summarized below.

1. Preservation of the composition is substantially complete with no decomposition of any of the components.

2. Neither the composition, nor any of its components nor any of its decomposition products can form when dissolved in the water which has to be in contact with crustacea, are toxic to the crustacea. These products are organized by the health organizations for use in foodstuffs.

3. The incorporation in the formulation of magnesium carbonate, in the established conditions of manufacture has resulted in the stabilization of the citric acid and the metabisulphide and, in the decomposition of these three products, the maganesium carbonate is decomposed into carbon dioxide which interferes in the utilization of oxygen by certain enzyme systems in the crustacea so as to avoid melanosis which requires oxygen, as well as to prevent the decomposition of the crustacea, which is improved by the metabisulphide and the citric acid.

4. It has also been found that in using the composition of the present invention in a solvent, it is best to proceed as follows:

a. Use 20 grams of the composition prepared as described above in 1 liter of drinking or sea water, to treat one kilogram of crustacea; or b. On a larger scale, in a vessel which is constructed of a suitable material such as plastic, stainless steel, or cement, add the composition in the form of a powder in a ratio of 20 grams per kilogram of the crustacea to be treated. The crustacea are then added on top of the powdered preparation and finally the requisite water in a proportion of 1 liter per kilogram of crustacea is added. The mixture of water, crustacea and the composition is allowed to stand without stirring or other similar disturbance or movement and after 10 minutes the crustacea are dried. The dried crustacea after this immersion are immediately frozen or preserved in the cold with the ice.

Hundreds of trials have been carried out with lobsters, langustines, shrimps, crabs, red prawns and white prawns. The said quantity of 20 grams of the composition per kilo of the crustacea has been found to give the best results, although amounts of 10 to 30 grams of composition per kilo of crustacea are also useful.

The invention will be apparent from the examples which follow. These examples are given by way of illustration and are not to be considered as limiting.

EXAMPLE 1

Lobsters, crabs, and shrimps recently caught were given the aforesaid treatment as at 4 above. Those which were frozen and preserved in chambers at −20°C stood up to 6 months without external modification. When the lobsters and crabs were unfrozen by preserving them in cool chambers at 5°C, they did not exhibit melanosis during the first 24 hours and after 48 hours there can be detected the start of spots of melanosis. On unfreezing the lobsters and preserving them in cool chambers at 5°C, they did not exhibit melanosis during the first 48 hours and only some show black spots after 72 hours.

The lobsters and crabs which were directly preserved in fresh cool chambers at 2°C could stand up to 8 days without exhibiting melanosis and shrimps can stand up to 12 days without exhibiting melanosis. In these cases the start of melanosis was slow, confirming that they could stand for longer periods of up to 50% more time without the appearance of melanosis.

EXAMPLE 2

Studies on red and white prawns, gave the following results:

Crustacea treated by the process as that of Example 1, and which were frozen stood up to 9 months without any external modification being noticed. When unfrozen, red prawns stood up to 48 hours without the start of any sign of melanosis and after 72 hours the signs started but only slowly.

White prawns on defreezing stood up to 24 hours without melanosis and after 48 hours melanosis had already started, although slowly, enabling it to be confirmed that in these two cases commercially they could even stand up to 24 hours more prior to sale and consumption.

Red prawns and white prawns, which were passed after treatment directly for chilled preservation in cool chambers at 2°C, stood up to 8 days without melanosis starting. After 8 days these chilled crustacea started decomposing independently of the start of melanosis.

As a result of these trials it can be concluded that the new composition for preservation has given excellent results, since there is no toxicity, and preservation in a frozen and chilled state of crustacea has shown it to be superior to present compositions which are on the market.

As will be understood by experts in the art several changes can be made in the formal action of the additive according to the invention without departing from the spirit and scope of the invention, such as for example, the invention also includes the substitution of tartaric for all or part of critic acid and sodium and potassium sulfite and bisulfite and potassium metabisulfite for all or part of the sodium metabisulfite.

What I claim is:

1. A composition for preserving crustacea by preventing melanosis, consisting essentially of about 25 to 35% by weight of magnesium carbonate, about 40 to 60% by weight of citric acid and about 15 to 25% by weight of a metabisulfite selected from the group consisting of sodium and potassium metabisulfite and mixtures thereof.

2. A composition according to claim 1 which is in granular form, the size of the granules being about 400 mesh per square centimeter.

3. A composition according to claim 1 wherein the metabisulfite is sodium metabisulfite.

* * * * *